Oct. 14, 1958 T. KILBURN 2,856,126

MULTIPLYING ARRANGEMENTS FOR ELECTRONIC DIGITAL COMPUTING MACHINES

Filed April 13, 1954 6 Sheets-Sheet 1

INVENTOR
TOM KILBURN
BY Stevens, Davis, Miller & Mosher
ATTORNEYS

INVENTOR
TOM KILBURN
BY Stevens, Davis, Miller + Mosher
ATTORNEYS

Oct. 14, 1958

T. KILBURN 2,856,126

MULTIPLYING ARRANGEMENTS FOR ELECTRONIC DIGITAL COMPUTING MACHINES

Filed April 13, 1954

6 Sheets-Sheet 3

INVENTOR
TOM KILBURN
BY Stevens, Davis, Miller & Mosher
ATTORNEYS

Oct. 14, 1958 T. KILBURN 2,856,126

MULTIPLYING ARRANGEMENTS FOR ELECTRONIC DIGITAL COMPUTING MACHINES

Filed April 13, 1954 6 Sheets-Sheet 4

INVENTOR
TOM KILBURN
BY Stevens, Davis, Miller & Mosher
ATTORNEYS

Oct. 14, 1958 T. KILBURN 2,856,126

MULTIPLYING ARRANGEMENTS FOR ELECTRONIC DIGITAL COMPUTING MACHINES

Filed April 13, 1954 6 Sheets-Sheet 5

INVENTOR
TOM KILBURN
BY Stevens, Davis, Miller & Mosher
ATTORNEYS

Oct. 14, 1958 T. KILBURN 2,856,126

MULTIPLYING ARRANGEMENTS FOR ELECTRONIC DIGITAL COMPUTING MACHINES

Filed April 13, 1954 6 Sheets-Sheet 6

INVENTOR
TOM KILBURN
BY Stevens, Davis, Miller & Mosher
ATTORNEYS

United States Patent Office 2,856,126

Patented Oct. 14, 1958

2,856,126

MULTIPLYING ARRANGEMENTS FOR ELECTRONIC DIGITAL COMPUTING MACHINES

Tom Kilburn, Davyhulme, England, assignor to National Research Development Corporation, London, England, a corporation of Great Britain Application April 13, 1954, Serial No. 422,886

Claims priority, application Great Britain April 20, 1953

13 Claims. (Cl. 235—61)

This invention relates to electronic digital computing machines and is more particularly concerned with arrangements for effecting multiplication and/or division in machines which operate, at least so far as multiplication is concerned, in the serial mode with various numbers such as the multiplicand and partial products represented by electric pulse signal trains.

The object of the invention is to provide a simplified arrangement in which the amount of apparatus, particularly electron discharge tubes or their equivalents in the form of crystal rectifiers, transistors or the like, is appreciably reduced and/or the overall speed of operation is increased.

In accordance with the broadest aspect of the invention a multiplying or dividing arrangement for use in such machines is characterised by the provision of means whereby a plurality of electric signals representing different multiples of the multiplicand number are made available simultaneously in conjunction with means by which a series of appropriate selections from such plurality of multiple-representing signals is made each under the control of different groups of digits of the multiplier number instead of by each single digit of such multiplier number in turn, as hitherto. Thus in a multiplier for binary numbers, instead of making the multiplicand number-representing signal repeatedly available once for every one of the $n$ binary digits of the multiplier number and then, according to the examined value of each of the multiplier digit signals in turn, either selecting or rejecting such multiplicand number-signal for transmission as a partial product to an accumulating device, after appropriate alteration of power value in accordance with the related power value of the examined multiplier digit signal, according to the present invention several, say three, signals representative of different multiples of the multiplicand number are made available simultaneously, e. g. at its original unaltered value, at twice its original value and at three times its original value and then by means of suitable gate circuit arrangements controlled by each pair of successive digits of the multiplier number signal, appropriate selection of such multiplied value signals is made for transmission to an accumulating device so that only $n/2$ steps is necessary to deal with each of the digits of the multiplier number. In a multiplier of the kind described in the specifications of U. S. A. Patent No. 2,685,407, issued August 3, 1954, to A. A. Robinson for "Circuit for Multiplying Binary Numbers," hereinafter referred to as specification A, and of U. S. A. patent application Serial No. 333,908, filed January 29, 1953, by F. C. Williams et al., hereinafter referred to as specification B, such an arrangement decreases the number of successive delay and adding device required in similar ratio with consequential saving of apparatus.

In order that the nature of the invention may be more readily understood various embodiments thereof in multiplier arrangements of the general type described in the aforesaid copending applications will now be described in detail with reference to the accompanying drawings in which.

Figure 4:
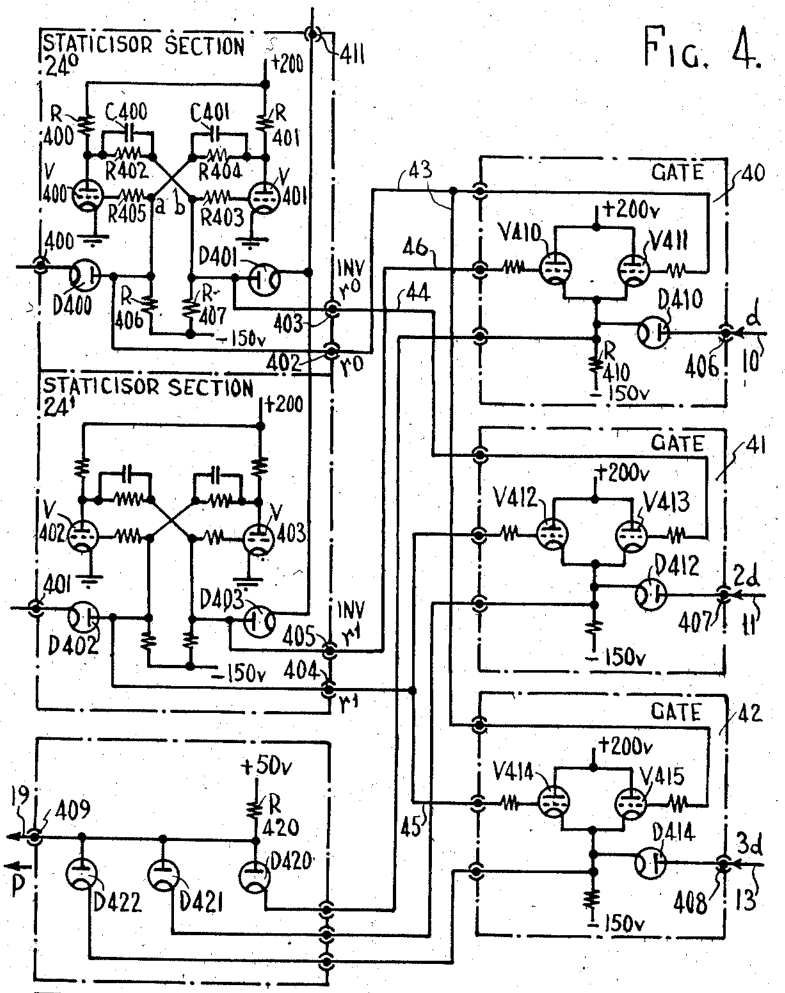
Figure 4 is a detailed circuit diagram of one practical embodiment of the arrangement shown in Figure 3.
Figure 4A:
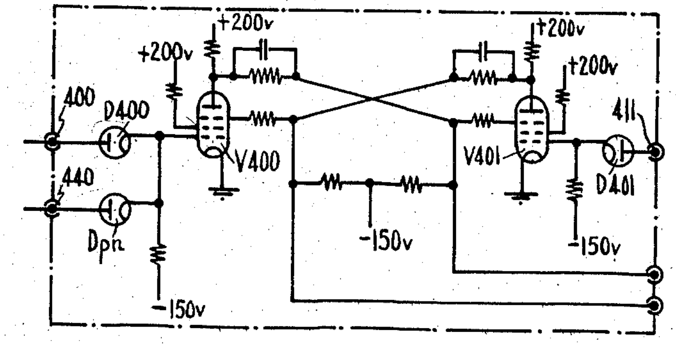

Figure 4*a* illustrates a modification of the arrangement of Figure 4.

Figure 1:
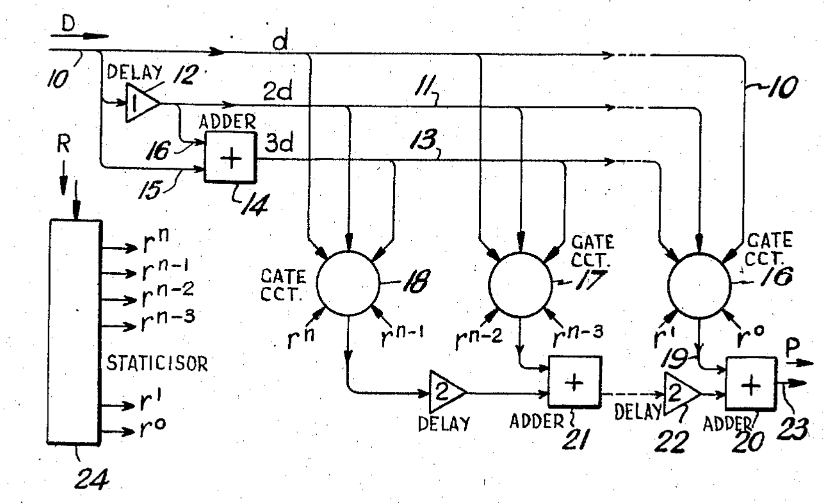
Figure 1 is a block schematic diagram illustrating the principle of the invention.
Figure 5:
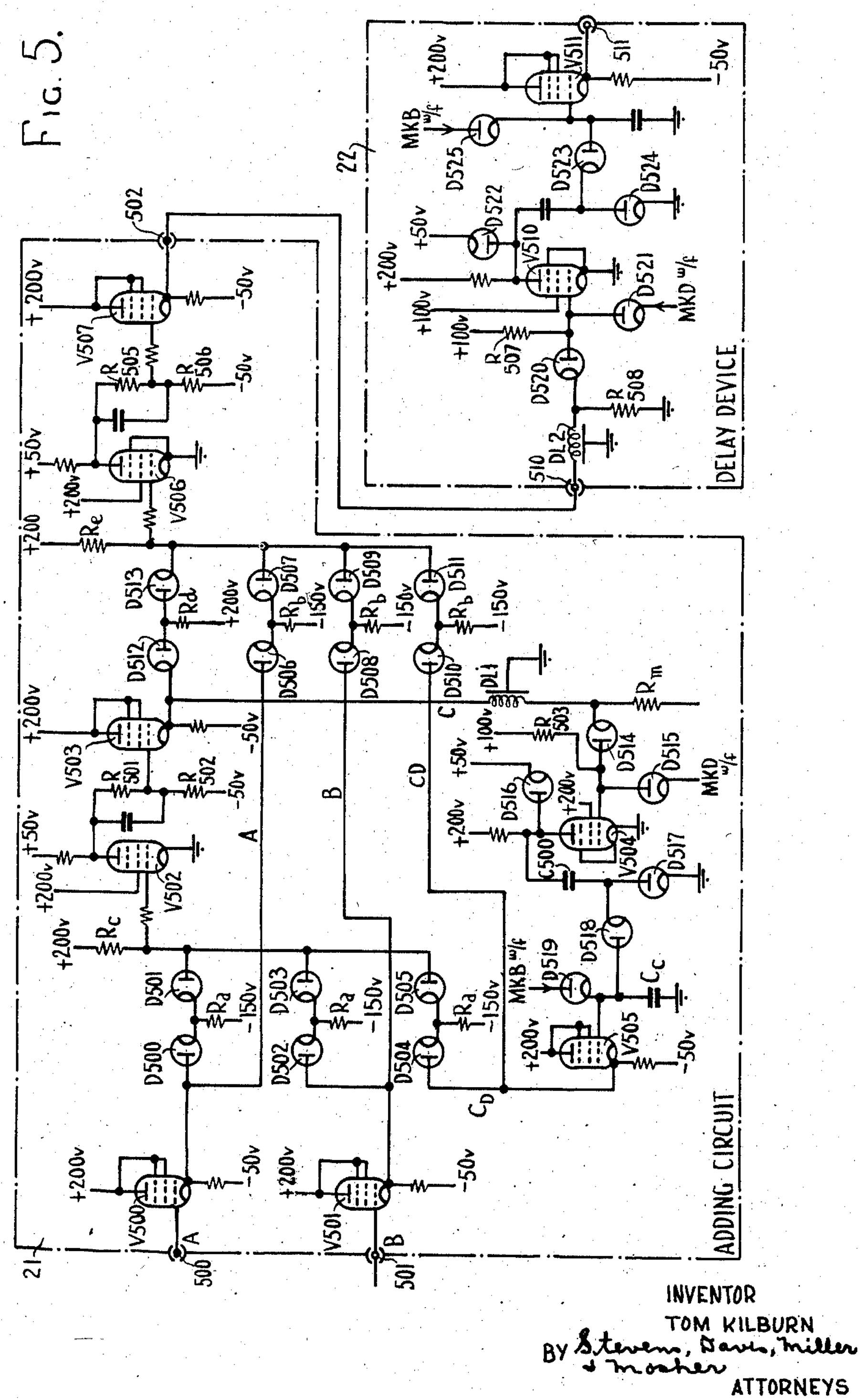

Figure 5 is a detailed circuit diagram of one form of adding circuit and an associated delay device for use in an arrangement as shown in Figure 1 and in conjunction with a computing machine as described in the specification of copending application Serial No. 416,674, filed March 16, 1954, by F. C. Williams et al., hereinafter referred to as specification C.

Figure 6:
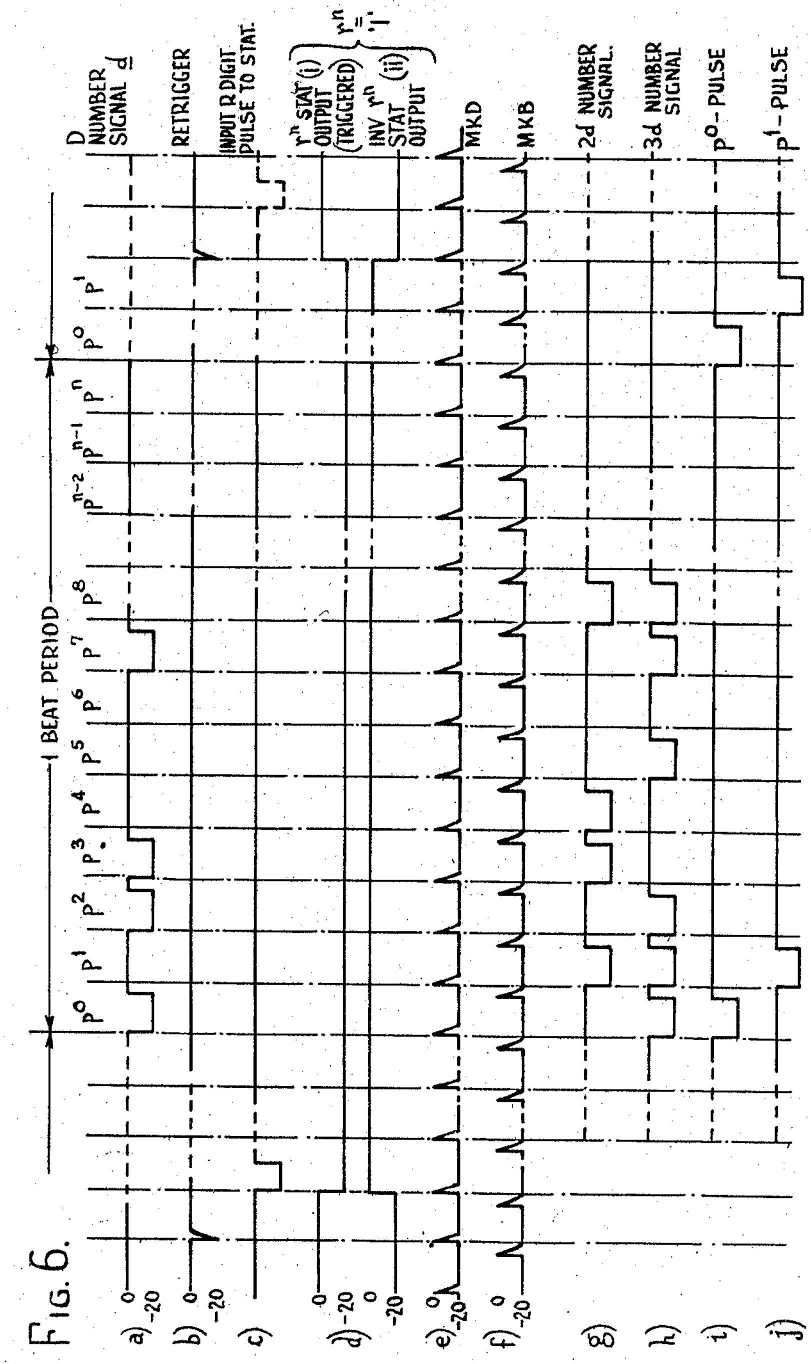

Figure 6 comprises a series of electric waveforms relating to the arrangements of Figs. 4, 4*a* and 5.

Figure 7:
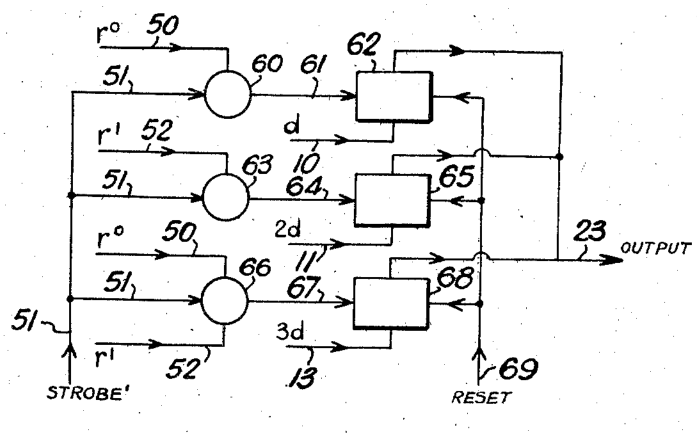

Figure 7 is a block diagram illustrating yet a further gate circuit arrangement for the device of Figure 1 utilising transistor devices.

Figure 8:
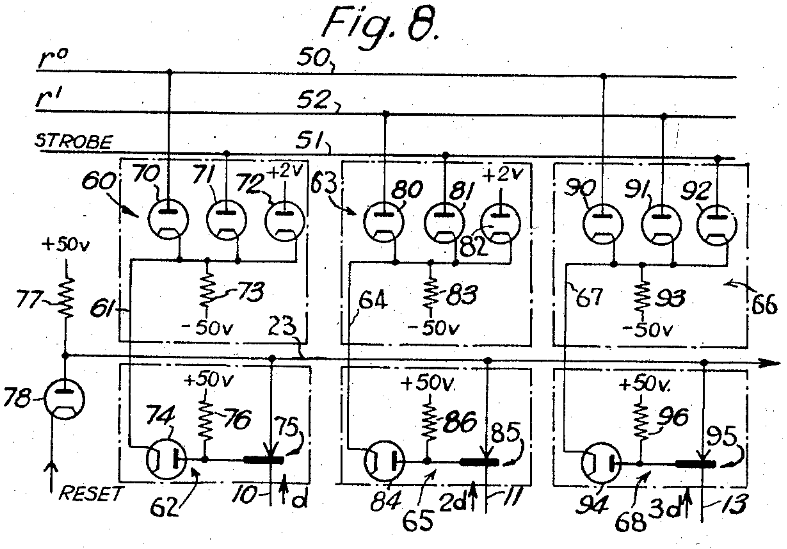

Figure 8 is a more detailed circuit diagram of the arrangement of Figure 7.

Figure 9:
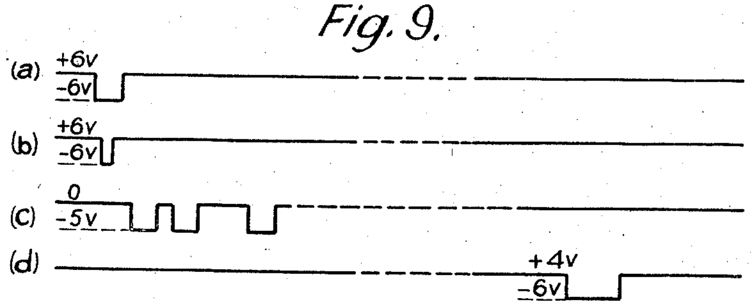
Figure 10:
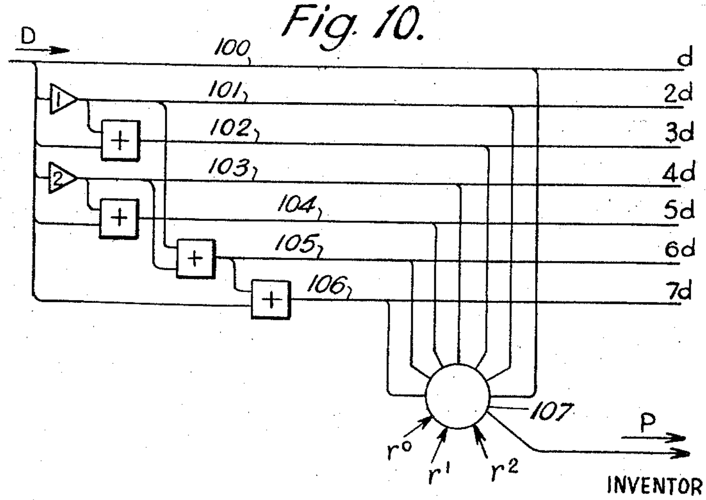

Figure 9 comprises a series of electric waveform diagrams relating to the circuit of Figure 8, while, Figure 10 is a block schematic diagram similar to Fig. 1 but showing an extension of the invention.

The multiplying arrangement shown in Figure 1 is basically similar to that described in the aforesaid specifications A and B and comprises an input conductor 10 upon which the multiplicand number D is made available at a predetermined time in the form of a serial pulse train in which the presence of a pulse during any one of the sequential digit intervals of the train, indicates the binary digit value "1" and the absence of a pulse within any one of such digit intervals indicates binary value "0." This conductor 10 carrying the multiplicand number-signal $d$ corresponds to the normal single input conductor of the aforesaid earlier arrangements. In the present instance, however, a second supply conductor 11 is provided and this is connected so as to be supplied with the signal $d$ from the conductor 10 by way of a delay device 12 which imposes a delay time equal to one digit interval of the pulse train whereby the pulse train $2d$ on the conductor 11 represents the original multiplicand number D increased in value by a factor of 2. A third conductor 13 is also provided and this is connected to the output of an adding circuit 14, one input 15 of which is connected directly to the conductor 10 carrying the signal $d$ and the other input 16 of which is connected to the conductor 11 carrying the signal $2d$ so that the pulse signal train $3d$ on this third conductor 13 is representative of the original multiplicand number D multiplied by a factor of 3.

As in the earlier arrangements of said specifications A and B a plurality of gate devices 16 . . . 17, 18 are provided for controlling the flow of multiplicand-representing signals in accordance with the values of the different digits of the multiplier number R. These gate devices are, however, of special form, each being controlled by different sequential pairs of the digits of the multiplier number R and each controlling the selection of an appropriate one of the three available signals $d$, $2d$ and $3d$ in accordance with the value of the controlling R digits. Thus gate device 16 has three input terminals connected respectively to the conductors 10, 11 and 13 carrying the different multiple-representing signals of the multiplicand number D and is controlled by the first and second digits $r^0$ and $r^1$ of the multiplier number R. Similarly the remaining gate devices . . . 17, 18 are each also connected to the conductors 10, 11 and 13 and are controlled by different pairs of R digits $r^{n-3}$, $r^{n-2}$, $r^{n-1}$ and $r^n$.

The output lead 19 from the first gate device 16 is connected to one input terminal of an adding circuit 20, while the outputs of the remaining gate devices . . . 17 except the last, 18, i. e. that which is controlled by the most significant pair of digits $r^{n-1}$ and $r^n$ of the multiplier number R, being each likewise connected to one input terminal of an associated adding circuit, such as that shown at 21. The second input terminal of each adding circuit, e. g. 20 is supplied from the output of the next similar adding circuit e. g. 21, or, in the case of the last adding circuit, from the next and last gate device 18, by way of a two-digit interval delay device 22 and so on, in a manner similar to the arrangements of the aforesaid specifications A and B, but using two-digit interval delay devices instead of the one-digit interval delay devices used in the earlier arrangements. The output lead 23 from the adding circuit 20 provides a resultant pulse train representing the product number P.

The values of the various digit signals $r^0$, $r^1$ . . . $r^n$ of the multiplier number R need to be represented separately in a persistent or static form and, if such signals are available only as a serial pulse signal train, this is conveniently effected by applying the R number signal to a conventional staticisor device 24 comprising a plurality of separate sections, one for each digit position of such R number signal, and using the various outputs from such different sections thereof for controlling the gate devices.

The gate devices 16 . . . 17, 18 are of specialised form in that, when supplied with input control signals representing the binary value "1" for the lower value digit of the pair of multiplier digits and value "0" for the other digit, connection is made only from conductor 10 through the gate device whereas when the supplied control signals are reversed to represent value "0" for the lower values and "1" for the higher value of the two multiplier digits, connection is made only from conductor 11 through the gate device. When, however, both of the multiplier digits are of value "1" then the two previous connections are both blocked and connection is made only from the third conductor 13. When both input control signals represent the binary value "0" then all connections between leads 10, 11 and 12 and the gate output are blocked.

Figure 2:
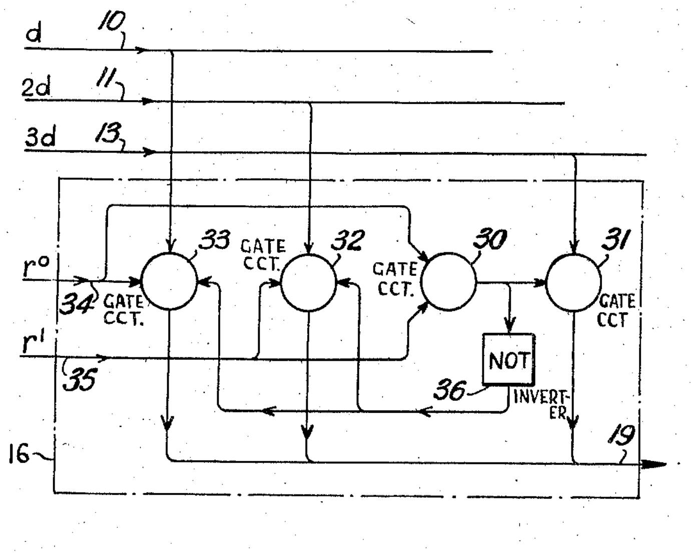
Figure 2 is a more detailed block diagram showing one possible form of the various individual gate circuit arrangements for the device of Fig. 1.

One form of such specialised gate device is shown schematically in Figure 2 and comprises a first "And" type gate circuit 30 (e. g. of the multiple-diode type) having two input terminals connected respectively to leads 34, 35 which are supplied, e. g. from staticisor 24, Fig. 1, with the potentials derived from the staticised R number digit signals $r^0$ and $r^1$. The output from this first gate circuit 30 supplies one controlling input terminal of a second similar gate circuit 31 whose other input terminal is connected to conductor 13 carrying the multiplicand signal $3d$. The output from gate circuit 30 is also applied as the controlling input of a negator or "Not" (inverter) circuit 36 whose output provides one controlling input for each of further, third and fourth, gate circuits 32, 33. The other controlling input terminals of gate circuit 32 are connected to the conductor 11 and lead 35 respectively while the similar input terminals of gate circuit 33 are connected to the conductor 10 and lead 34. The output terminals of gate circuits 31, 32 and 33 are each connected through suitable buffer circuit means to the output lead 19.

The operation of this gate device is as follows. Except when both the $r^0$ and the $r^1$ digits are of value "1," gate circuit 30 will be blocked and no output therefrom will be provided for the "Not" circuit 36 which accordingly supplies an output gate-opening control signal to gate circuits 32, 33 under these conditions. In the absence of a "1" digit signal for either of the $r^0$ or $r^1$ signal leads 34, 35 all of the gate circuits will remain closed and no signal will appear on the output lead 19. In the event that the $r^0$ digit is value "1" and the $r^1$ digit is value "0" then gate circuit 33 will be opened due to the combined effect thereon of the $r^0$ signal on lead 34 and the signal provided by the "Not" circuit 36; connection will accordingly be made from the conductor 10 to the output lead 19 whereby the multiplicand pulse train signal $d$ (representing $D \times 1$) will pass through the gate circuit. In the event that the $r^0$ digit is value "0" and the $r^1$ digit is value "1" the gate circuit 32 alone will be opened and the pulse train signal $2d$ (representing $D \times 2$) on conductor 11 will pass to the output lead 19. When both of the digits $r^0$ and $r^1$ are of value "1" then gate circuit 31 alone will be opened by the control signal supplied thereto from gate circuit 30 to allow passage of the multiplicand pulse train signal $3d$ (representing $D \times 3$) on conductor 13 to the output lead 19. At the same time the provision of an input signal from gate circuit 30 to the "Not" circuit 36 will suppress the output control signal from the latter whereby the gate circuits 32 and 33 will now be closed.

Figure 3:
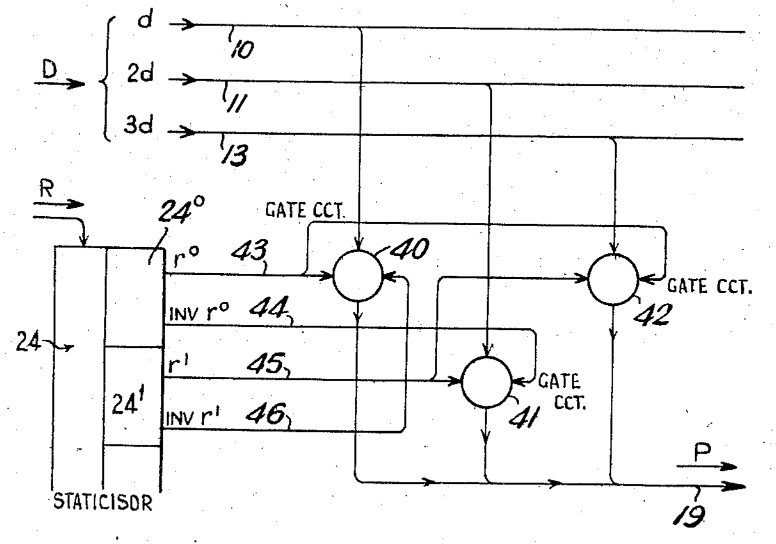
Figure 3 is a further block diagram illustrating an alternative gate circuit arrangement for the device of Fig. 1.

If, as is frequently the case, the device 24 used for staticising the R digit signals is capable of providing two paraphase or inverse outputs at each digit-handling section thereof then a simplified gate device as shown in Fig. 3 may be used. In this arrangement three simple three-input gate circuits 40, 41 and 42 control respectively the connection of the leads 10, 11 and 13 to the output lead 19. Gate circuit 40 which controls the supply of signal $d$ ($D \times 1$) is controlled by the $r^0$ and inverse $r^1$ outputs from the sections $24^0$ and $24^1$ respectively of the staticisor device 24 on leads 43, 46 and is accordingly opened only when $r^0$ is of value "1" and $r^1$ is of value "0." Gate circuit 41 which governs the supply of signal $2d$ ($D \times 2$) is controlled by the $r^1$ and inverse $r^0$ outputs from such sections $24^0$ and $24^1$ of the staticisor device 24 on leads 45, 44 and is therefore opened only when $r^0$ is of value "0" and $r^1$ is of value "1." Gate circuit 42 which governs the supply of signal $3d$ ($D \times 3$) is controlled by the $r^0$ and $r^1$ outputs from staticisor device 24 on leads 43, 45 and is therefore opened only when both $r^0$ and $r^1$ are of value "1."

One practical form of the arrangement shown schematically in Fig. 3 is given in Fig. 4 in which staticisor section $24^0$ comprises two triode valves V400, V401 arranged to form a conventional two-stable-state trigger circuit and each having their cathodes earthed and their anodes joined respectively by way of load resistors R400, R401 to a source of positive potential, +200 v. The anode of valve V400 is connected by way of resistors R402 and R403 to the control grid of valve V401 while the anode of valve V401 is likewise connected by way of resistors R404 and R405 to the control grid of valve V400. Resistors R402 and R404 are shunted by "speed-up" capacitors C400 and C401 while the junction points $a$ and $b$ between resistors R404 and R405 and between resistors R402 and R403 are respectively connected through resistors R406 and R407 to a source of negative potential −150 v. The triggering input terminal 400 of this staticisor section is connected to the cathode of diode D400 whose anode is joined to the aforesaid junction point $a$ while a resetting terminal 411 for the same staticisor section is connected to the cathode of a diode D401 whose anode is joined to the junction point $b$. Junction point $a$ is connected to the output terminal 402 supplying the $r^0$ output and junction point $b$ is similarly connected to the output terminal 403 supplying the INV $r^0$ output.

This embodiment is designed for use with a machine, such as that described in specification C, where signals defining the value of the different digits of the multiplier number R are available in parallel form, i. e. a signal for each digit on a separate lead and as a momentary pulse if the digit value is "1" and as the absence of such a pulse if the digit value is "0"; all of the signal pulses for the different multiplier or R digits occur simultaneously and may, for instance, arise from the "flashed-over" signals from a circuit arrangement comprising a multi-section delay line to which a serial form pulse train signal representing the multiplier number R is applied and from which suitable output potentials are obtained by testing the voltage existing at different junction points along the delay line when the input pulse train is suitably located along the length of the line. An arrangement of this kind may be generally similar to the write input control unit illustrated in Fig. 4 of the aforesaid specification C. The present embodiment is, however, not limited to use with such an arrangement and is capable of use with any machine in which the respective digits of the multiplier number are available in parallel form.

Before multiplication is commenced, a retrigger pulse is arranged to occur as shown at Fig. 6*b* and this pulse is applied to terminal 411 to reset the trigger circuit to the "off" state where valve V401 is cut-off and valve V400 is conducting. Under such conditions the output $r^0$ is at about or slightly above earth potential whereas that of INV $r^0$ is negative at, say, −20 v. Subsequent to the arrival of the retrigger pulse, the parallel form signals representing the R number digits are made available as shown in Fig. 6*c*, there being a negative pulse if the particular R digit is of value "1" and no pulse if it is of value "0." The arrival of such a "1"-representing pulse at triggering input terminal 400 will reverse the circuit state to the condition where valve V400 is cut-off and valve V401 is conducting. In this state the output on lead 43 from terminal 402 is negative-going as shown in Fig. 6*d*(*i*) whereas that on lead 44 from terminal 403 is at the raised level of earth potential or slightly above as shown in Fig. 6*d*(*ii*). This condition will persist until the application of the next retrigger pulse to terminal 411. This does not arrive until after the end of the multiplication operation which is about to take place, as shown in Fig. 6*d*.

The second staticisor section $\mathbf{24^1}$ comprises a precisely similar arrangement of valves V402 and V403 provided with triggering input terminal 401 and output terminals 404 and 405 supplying the $r^1$ and INV $r^1$ outputs. The circuit is supplied with the same retrigger pulses from resetting input terminal 411.

The gate circuit 40 of Fig. 3 is constituted by a double triode circuit of valves V410 and V411 having their respective anodes directly connected to source of positive potential +200 v. and with their cathodes interconnected and joined through resistor R410 to source of negative potential −150 v. The common cathode point is also joined to the cathode of a diode D410 whose anode is connected to input terminal 406 which is supplied with the *d* signal from lead 10. The control grid of valve V410 is joined by way of lead 46 to the output terminal 405 of the staticisor section $\mathbf{24^1}$ while the control grid of the other valve V411 is similarly joined by lead 43 to the output terminal 402 of the staticisor section $\mathbf{24^0}$.

The second gate circuit 41 comprises an identical arrangement of two triode valves V412 and V413 and a diode D412 whose anode is connected to input terminal 407 to which is supplied the 2*d* input from lead 11. The control grid of valve V412 is joined to the output terminal 404 of staticisor section $\mathbf{24^1}$ and the control grid of valve V414 is joined to the output terminal 403 of the staticisor section $\mathbf{24^0}$.

The third gate circuit 42 also consists of an identical arrangement of two triode valves V414 and V415 and an associated diode D414 whose anode is connected to the input terminal 408 to which the **3*d* input waveform is supplied from lead 13. The control grid of valve V414 is joined to the output terminal 404 of staticisor section $\mathbf{24^1}$ whereas the control grid of valve V415 is joined to the output terminal 403** of staticisor section $\mathbf{24^0}$.

The common cathode points of each of the three gate circuits 40, 41 and 42, which constitute the gate output points, are each connected respectively to the cathode of a related diode D420, D421 and D422. The anodes of these diodes are interconnected and joined to output terminal 409 supplying the lead 19 and also by way of resistor R420 to a source of positive potential +50 v.

The multiplicand-representing signals applied to input terminals 406, 407, 408 are of the form shown, for example, in Figs. 6*a*, 6*g* and 6*h* and consist of negative-going square pulses from a resting level of a little above earth potential. Such pulses, representing binary value "1," persist for the major portion of the digit period in which they occur.

Only when both of the control grids of the two triode valves of any gate circuit are driven negative will the potential at the common cathode point be able to fall during the arrival of the negative-going pulses of the incoming *d*, **2*d* and 3*d* signal waveforms at terminals 406, 407 and 408. Thus if the trigger circuits in staticisor sections $\mathbf{24^0}$ and $\mathbf{24^1}$ controlled by multiplier digits $r^0$ and $r^1$, are both triggered due to the respective R digits being both of value "1" then the gate 42 will be the only one in which the control grids of both of the two valves (V414 and V415**) are driven negative simultaneously thereby allowing the 3*d* input signal at terminal 408 to pass through buffer diode D422 to the output terminal 409. Each of the other gates will have at least one of the control grids of the two triode valves held positive thereby preventing any fall of the cathode potential in response to the signals applied to their respective input terminals 406 and 407.

If the multiplier number R is available only as a serial pulse signal train, the various staticisor sections $\mathbf{24^0}$, $\mathbf{24^1}$ . . . can readily be modified in the manner shown in Fig. 4*a* whereby each section selects its own related digit signal within such signal train. This is effected by providing an additional diode D*pn* connected as shown between an input terminal 440 and the control grid of valve V400. Terminal 440 is supplide with a pulse timed to coincide with the particular digit period of the R number-representing signal which is applied to terminal 400. Thus if the section is that of $\mathbf{24^0}$ as shown then a $p^0$-pulse, as shown in Fig. 6*i* will be applied to terminal 440. The generation of such *p*-pulses and their use in selective examination of particular digit periods of a serial pulse train is now well-known and will be found described, inter alia, in specifications A and B.

One constructional form of adding circuit, such as those shown at 20 and 21 in Fig. 1, is illustrated in Fig. 5 and comprises input terminals 500 and 501 for receiving respectively the two input pulse trains (A and B). Input terminal 500 is connected to control grid of valve V500 arranged as a cathode followed. Input terminal 501 is similarly connected to control grid of valve V501 also arranged as a cathode follower. The cathode output of valve V500 is applied to the anode of diode D500 and also to the anode of diode D506. Diode D500 has its cathode connected to the cathode of further diode D501 and also by way of resistor R*a* to source of negative potential −150 v. The cathode of diode D506 is similarly connected to the cathode of diode D507 and by way of resistor R*b* to source of negative potential −150 v. The cathode output of valve D501 is similarly applied to the anode of diode D502 and to the anode of diode D508. The cathode of diode D502 is connected to cathode of diode D503 and by way of further resistor R*a* to source of negative potential −150 v. Cathode of diode D508 is likewise connected to diode D509 and by way of further resistor R*b* to source of negative potential −150 v.

A further pair of diodes D504, D505 are arranged similarly to diodes D500, D501 and D502, D503 by having their cathodes interconnected and joined by way of resistor R*a* to source of negative potential −150 v. The anodes of diodes D501, D503 and D505 are interconnected and joined by way of resistor R*c* to source of positive potential +200 v. and also to the control grid of valve V502 arranged as an amplifier having its cathode earthed and its anode connected through potentiometer network of resistors R501, R502 to source of negative potential −150 v. The tapping point between resistors R501, R502 is connected to the control grid of valve V503 arranged as a cathode follower.

The cathode output point of valve V503 is connected to the cathode of diode D512 whose anode is connected to the anode of a further diode D513 and also by way of resistor R*d* to source of positive potential +200 v. In addition the cathode output of valve V503 is applied to one end of a delay line element DL1 whose delay time is rather less than the time interval of one digit period of the pulse signal trains used in the machine. That is to say, if the machine operates with a digit signalling speed of 1 microsecond then the delay line DL1 would have a delay time of approximately ½ microsecond. If, on the other hand, the digit signalling speed of the machine is, say, 3 microseconds, then the delay line would have a delay time of about 1½ to 2 microseconds.

The opposite end of the delay line DL1 is connected to earth by way of matching resistor R*m* and also to the cathode of a diode D514 whose anode is joined to the control grid of valve V504, the anode of diode D515 and also by way of resistor R503 to source of positive potential +100 v. The cathode of diode D515 is supplied with the MKD waveform of Fig. 6*e*.

Valve V504 is arranged as an amplifier with its anode potential clamped, in the rise direction, at +50 v. by diode D516. The anode output of valve V504 is applied by way of condenser C500 to the cathode of diode D518 whose anode is coupled to the control grid of valve V505. In addition, the cathode of diode D518 is connected to the anode of diode D517 whose cathode is joined to earth while the anode of diode D518 is additionally connected to a capacitor C*c* whose opposite terminal is earthed and also to the cathode of a diode D519 whose anode is supplied with the MKB waveform shown in Fig. 6*g*.

The anodes of diodes D507, D509, D511 are interconnected and joined to the cathode of diode D513 and thence by way of resistor R*e* to source of positive potential +200 v. and also to the control grid of valve V506 arranged as a normal voltage amplifier and having its cathode earthed and its anode output applied to one end of a potentiometer network of resistors R505, R506, the opposite end of which network is connected to source of negative potential −50 v. The junction point between resistors R505 and R506 is connected to the control grid of valve V507 arranged as a cathode follower and supplying its cathode output to output terminal 502.

The operation of this circuit is as follows. The input number-representing pulse trains are substantially of the form shown in Fig. 6*a* with the normal resting level of the input waveform at a little above earth potential and with each one binary digit signalled by a negative-going pulse of some 20 v. amplitude for the major portion of the digit interval period commencing with the beginning of such period. Binary value "0," on the other hand, is signalled by the absence of any such negative-going pulse during the digit period. Normally valve V502 is taking grid current via resistor R*c* and current is flowing to the negative rail −150 v. through each of diodes D500, D502 and D504 as the anodes of such diodes are at a slightly higher positive potential than those of diodes D501, D503 and D505. Whenever a negative input pulse is applied to either of terminals 500 or 501 or arrives at the cathode output of valve V505, as explained later, the interconnected diode D500, D502 or D504 becomes cut off and the current flow to the negative rail is then by way of the opposite diode D501, D503 or D505 as the case may be thereby subtracting from the grid current available for the valve V502 through resistor R*c*. The values of resistors R*a* and R*c* are arranged so that whenever any two of the diodes D500, D502 or D504 are cut off simultaneously the control grid voltage of valve V502 drops suddenly to cut off point giving a positive-going output pulse at the valve anode which accordingly raises the potential at the junction point of network of resistors R501, R502 and provides a positive-going output pulse at the cathode of valve V503. This output signifies the production of a "carry" pulse (C) and this pulse is fed back through the delay line DL1 to provide, eventually, the "delayed carry" (CD) for application with the two input number trains (A and B) at terminals 500, 501 in the usual way.

The production of this "delayed carry" pulse is as follows. The delay line DL1, as already stated, imposes a delay of rather less than 1 digit period so that the positive-going output pulse arrives at the control grid of valve V504 in time to be present during the instant of occurrence of the next available MKD waveform pulse, Fig. 6*e*, which is at the commencement of the next following digit period. When this positive-going MKD pulse arrives at the control grid of valve V504 this valve, which is normally held cut off by the resting level of the MKD waveform, suddenly becomes turned on and as a result of this the normally clamped +50 v. level at its anode becomes suddenly lowered and a negative pulse output is applied through capacitor C500 and through diode D518 to the control grid of valve V505 where it causes such valve to be cut off thereby initiating the commencement of a negative-going output pulse at such valve cathode. At the same time capacitor C*c* is charged negatively and holds valve V505 cut off after the pulse output from valve V504 has decayed. Valve V505 remains cut off until the arrival of the next following MKB pulse, Fig. 6*f*, which by application through diode D519 discharges the condenser O*c* and raises the control grid potenial of valve V505 to its normal level thus terminating the output negative-going pulse applied to diodes D504 and D510. The pulse thus developed will, as will be seen, be a standard "1" digit-representing pulse but occurring in the digit interval next following that in which the initiating pulse was developed at the cathode of valve V503.

The operation of valve V506 is similar to that of valve V502 with the exception that the application of a positive-going pulse to the cathode of diode D512, which is normally conductive to bleed current from the positive source +200 v. through resistor R*d*, becomes cut off and such current now flows to the control grid of valve V506 via diode D513 to supplement that provided by way of resistor R*d*. The resistors R*b*, R*d* and R*e* are so related that, the turning on of any one of the diodes D507, D509 or D511 whilst diode D513 is held cut off, will cause cutting off of valve V506 at its control grid. If, however, diode D512 is cut off by the "carry" pulse (C) from valve V503 then it becomes necessary for each of the three diodes D507, D509 and D511 to be turned on simultaneously before valve V506 becomes cut off. Thus a single input pulse (A or B) at terminal 500 or 501 will fail to produce a pulse at valve V503 and hence will not produce a "carry" pulse. Such pulse will, however, serve to cut off valve V506 to provide, via the cathode follower valve V507, an output pulse at terminal 502. Similarly two simultaneous input pulses (A and B) at terminals 500, 501 will produce a "carry" (C) pulse and this, by the action of turning on diode D513 will prevent the production of an output pulse through valves V506 and V507. If, however, such a "carry" pulse is present from the preceding digit position as the "delayed carry" (CD) pulse at valve V505 when one input is available at terminal 500 or 501 then a further "carry" pulse will be produced at valve V503 but no output pulse will be produced at terminal 502 due to the simultaneous turning on of diode D513. If, however, a previous carry (CD) pulse is present when input pulses (A and B) are provided at both terminals 500 and 501 then in spite of the turning on of diode D513 there will still be sufficient current drain through diodes D507, D509, D511 to produce an output pulse through valves V506 and V507 as well as a fresh carry pulse.

The above described amplitude adder is substantially similar in general principle to that described in the specification of Patent No. 2,671,607.

The detailed circuit arrangements of one suitable form of delay device for use in conjunction with the adding circuit just described, for example, as the delay 22 of Fig. 1, is also shown in Fig. 5 and comprises an input terminal 510 connected to a delay line element DL2 whose delay time is rather less than the time interval of 2 digit periods, for example, 1½ digit periods. Thus if the digit period time is 1 microsecond then the delay line DL2 will have a delay time of 1½ microseconds. The output from this delay line is connected through a matching resistor R508 to earth and to the cathode of a diode D520 whose anode is connected to the control grid of valve V510, to the anode of a diode D521 and through resistance R507 to a source of positive potential +100 v. Valve V510 is arranged in a circuit including diodes D522, D523, D524, D525 and valve V511 which is substantially identical with that already described with reference to valves V504, V505 and diodes D514 . . . D519. Diode D521 is supplied with the MKD waveform, Fig. 6*e*, while diode D525 is supplied with the MKB waveform, Fig. 6*f*. This delay device operates to provide a reshaped or regenerated digit pulse 2 digit intervals later than that applied to its input terminal 510. The delayed output pulse is available at output terminal 511.

The adding circuit 14 of Fig. 1 can be of similar form to that shown in Fig. 5 while the one-digit period delay device 12 can be of similar form to that shown in Fig. 5 except for appropriate shortening of the delay line element DL2 to have a delay time of about one half of the digit period time. It will be obvious however that other and quite different forms of both adding and delay circuits may be used instead of those specifically shown and described.

The general operation of the complete multiplier will be self-evident and follows the principle of that described in specifications A and B. Taking as a simple example, a multiplicand number D of 010001101 as shown in Fig. 6*a* and a multiplier number R of 00111001 then the *d* signal on lead 10 will be as shown in Fig. 6*a*, the 2*d* signal on lead 11 will be as shown in Fig. 6*g* and the 3*d* signal on lead 13 will be as shown in Fig. 6*h*. The pair of R digits of lowest significance (01) will operate gate 16 (Fig. 1) to allow the *d* signal to pass directly to adder 20. The pair of R digits of next higher significance (10) will operate the next gate to allow the 2*d* signal to pass to the associated adder while the next pair of R digits of still higher significance (11) will operate the next gate to allow the 3*d* signal to pass to the associated adder. The last pair of highest significance R digits (00) will fail to open the associated gate and no D number signal will be supplied to the associated adder. The 2-digit period delays between the adders provides for the requisite increase of value of the different partial products as they are combined in the final product-representing signal P on lead 23.

The further alternative arrangement shown in Figures 7, 8 and 9 utilises transistor devices, arranged in the manner described in the specification of copending patent application Serial No. 367,842, filed July 14, 1953, by F. C. Williams et al., hereinafter referred to as specification D, as the principal control means for selecting the required one of the three multiple-representing signals available. Referring first to Figure 7 the arrangement consists of a first "And" gate 60 controlled by the $r^0$ digit signal on lead 50 and a strobe pulse waveform as shown in Fig. 9*b* on lead 51. The output from this gate is applied over lead 61 to a first transistor gate device 62 which is also supplied with the multiplicand signal *d* on lead 10. A second "And" gate 63 which is controlled by the $r^1$ digit signal on lead 52 and the strobe pulse waveform as above, has its output applied over lead 64 to a second transistor type gate device 65. This gate device is supplied with the multiplicand signal 2*d* on lead 11. A further "And" type gate 66 controlled by the $r^0$ and $r^1$ digit signals and the same strobe waveform signal has its output applied over lead 67 to a third transistor type gate device 68 which is also supplied with the multiplicand signal 3*d* from lead 13. Each of the devices 62, 65, 68 is supplied over lead 69 with a reset pulse waveform as shown in Fig. 9*d* while the outputs from the three transistor gate devices are connected in parallel to the output lead 23.

The arrangement is such that, according to the nature of the applied combination of $r^0$ and $r^1$ digit signals, so an output pulse is delivered from one of the And gate circuits 60, 63 and 66 during the strobe pulse interval to operate as a trigger pulse to open the associated transistor type gate device. In the case where both $r^0$ and $r^1$ digit signals are of significance "1," trigger pulses will appear on all three control input leads 61, 64 and 67 to the transistor type gate devices, but it is arranged, as hereinafter described, that the device 68 controlling the multiplicand signal 3*d* takes precedence over the other two. As an additional safeguard it is also arranged that only one transistor gate device can be open at any one time.

Referring now to Figure 8 the "And" gate 60 comprises three diodes or equivalent crystal rectifiers 70, 71, 72 provided with a common load resistor 73 connected to a source of negative potential −50 v. The anode of diode 70 is connected to the lead 50 carrying the $r^0$ signal, that of diode 71 to lead 51 supplying the strobe pulse waveform and that of diode 72 to a source of positive potential +2 v. The common cathode point of the three diodes constituting the output lead 61 from the gate circuit is connected to the cathode of a further diode 74 whose anode is connected to the base electrode of a first transistor 75. This base electrode is also connected by way of load resistor 76 to a source of positive potential +50 v. The collector electrode of the transistor 75 is connected to the conductor 10 carrying the multiplicand signal *d* while the emitter electrode is connected to the output lead 23 and also to the junction between a resistor 77 and the anode of a diode 78. The opposite end of the resistor 77 is connected to a source of positive potential +50 v. while the cathode of the diode 78 is connected over lead 69 to the source of the reset pulse waveform.

The second "And" gate 63 comprises a further three diodes 80, 81 and 82 arranged similarly to the gate 60 but with the anodes of the first and second diodes 80, 81 connected respectively to the conductor 52 carrying the $r^1$ signal 2*d* and to the strobe pulse conductor 51. The associated transistor 85 is also similarly arranged with diode 84 between the output conductor 64 from the gate and the base electrode of the transistor. The collector electrode of the transistor 85 is connected to the conductor 11 carrying the multiplicand signal 2*d* and its emitter electrode to the output lead 23. The third gate 66 also comprises three diodes or crystal rectifiers 90, 91, 92 having their anodes connected respectively to conductors 50, 52 and 51 and having its output terminal connected via conductor 67 and diode 94 to the base electrode of the third transistor 95. The collector electrode of this transistor is connected to the conductor 13 carrying the multiplicand waveform 3*d* and its emitter electrode joined to the output lead 23.

The load resistors 73, 83, 93 of the "And" gates 60, 63 and 66 are adjusted in value (18 kilo-ohms), relative to the source of negative potential so that a bleed current of 3 ma. normally flows therethrough while each of the bleed resistors 76, 86, 96 associated with the base electrodes of the transistors is adjusted in value (27 kilo-ohms) to have a normal bleed current of 2 ma. therethrough, the resistor 77 being of a value (18 kilo-ohms) such as to have a 3 ma. bleed current therethrough.

The waveforms applied are as shown in Figure 9 where at (*a*) is shown the form of each of the $r^0$ and $r^1$ control potentials. Each of these are in the form of a single pulse available at a predetermined starting instant to signal value "1" and the absence of such pulse at the predetermined instant to signal value "0." The voltage levels are as shown, i. e. a normal quiescent level of +6 v. and a negative active level of −6 v. The strobe waveform shown in Figure 9*b* comprises a negative-going pulse of approximately 1/10 microsecond duration occurring during the aforesaid predetermined time interval of the "1" representing pulses of the $r^0$ and $r^1$ waveforms and varying from a normal resting level of +6 v. to an active level of −6 v. A typical multiplicand signal *d* is shown in Fig. 9*c* and comprises a square pulse waveform of appropriate configuration operating from a normal resting level of zero volts to an active negative level of −5 v. The multiplicand signals 2*d* and 3*d* are, of course, similar but of different digit configuration. The reset pulses which are applied after the multiplicand train has passed through the device consist, as shown, in Fig. 6*d* of a negative-going pulse of 3 microseconds duration from a resting level of +4 v. to an active level of −6 v.

Under normal quiescent conditions the output conductors 61, 64 and 67 of each of the "And" gates 60, 63 and 66 stand at +6 v. so that the base electrodes of each transistor are initially held at this level against the pull of the 2 ma. bleed through the associated resistors 76, 86, 96. The parallel connected emitter electrodes are held at +4 v. by the action of the diode 78 whose cathode is connected to the reset waveform source which stands at +4 v. under the pull of the 3 ma. bleed current through resistor 77. Each of the transistors is thus in its stable "off" state and the collector electrodes are effectively disconnected from the emitters and no signal available on such collector electrodes will appear on the output lead 23.

If now, for example, the $r^0$ input comprises a negative or "1" representing pulse coincident with an applied strobe pulse then the output lead from "And" gate 60 will fall to +2 v. i. e. the potential set by the anode of the third diode 72 during the period of the strobe pulse so that the base electrode of the associated transistor 75 also falls to +2 v. which is far below the potential (+4 v.) of its emitter electrode and the transistor device thereby switches to its "on" state. The emitter electrode is thus clamped to the collector electrode and the waveform on conductor 10, i. e. that of the multiplicand signal *d*, will pass to the output conductor 23. The reset pulse arrives subsequent to the termination of the multiplicand pulse signal train and thereafter drives the emitter electrodes of the transistor devices to −6 v. for a period of 3 microseconds during which time the previously operated transistor switches off and the original conditions are restored.

Similarly a pulse on the $r^1$ input signal causes the transistor 85 to be switched "on" and the multiplicand waveform 2*d* to be fed to the output lead 23.

If both the $r^1$ and $r^2$ input signals have active "1" pulses simultaneously then the output connections 61 and 64 of "And" gates 60 and 63 both move to +2 v. together, but the output connection 67 from the third gate 66, is, at the same time, taken to −6 v. thereby taking the common connected emitter electrodes with it and thus preventing the transistors 75 and 85 from being switched "on." The signal applied over lead 13 to the collector electrode of transistor 95 is thus the only one effective to pass to the output conductor 23. As an additional safeguard it is arranged that the emitter current 3 ma. is only sufficient to keep one transistor at a time in the "on" state.

The values of current described above relate to transistor type LS.737-Red Spot manufactured by Standard Telephones and Cables Ltd., London.

The principle of the invention can obviously be extended by increasing the number of multiples of the multiplicand signal D which are made available, and thus, as shown in Figure 10, a total of seven values of the multiplicand number signal *d*, 2*d* . . . 7*d* are made available on leads 100, 101 . . . 106 by suitable delay and adding devices as shown. Each of these leads is separately connected to a controlling gate device such as that shown at 107 and each gate device controlled by three separate digit signals of the multiplier number e. g. $r^0$, $r^1$ and $r^2$. The outputs from the gate devices are fed, as before, to subsequent adding circuits through a delay device which, in this instance, imposes a delay time equal to three digit intervals. The operation of this arrangement will be obvious from the description already given in connection with Figures 1 and 2.

From the practical point of view the increased complexity of the gate devices which are needed to select the required multiple of the multiplicand number signal under the control of the larger groups of *r* digits, the ancillary apparatus in the form of delay devices and adding circuits necessary to derive the different multiples of the multiplicand number D and the longer value delay devices between each of the adding circuits eventually outweighs the advantage obtained. It is probable that the systems shown in Figures 1–9 in which only three separate multiple values of the multiplicand number are made simultaneously available is the optimum arrangement.

Although the invention has been shown applied to a specialised form of multiplying device and dealing with binary numbers it will be obvious that it is capable of more general application to other forms of multiplying apparatus including those in which multiplication is effected in a relatively slow manner by straight "programme" controlled methods.

I claim:

1. A multiplying arrangement for an electronic digital computing machine which includes means for providing a plurality of electric signals representing respectively each of the plurality of different multiples of the multiplicand number D within the range *d*, 2*d* . . . *pd* where *p* is the total number of integral factors capable of being defined by a single group of a predetermined number *q* of digits of the multiplier number R, multiple-signal selection means connected to be controlled by different groups of *q* consecutive digits of the multiplier number, said multiple-signal selection means operating to effect a series of appropriate selections from said plurality of multiple-representing signals each selection being under the control of a different one of said groups of *q* digits of the multiplier number and means for combining said selected multiple signals to form a signal representing the required product number.

2. A multiplying arrangement according to claim 1 for operation with members represented in the binary scale in which said multiple-signal providing means includes means for providing electric signals representing respectively the multiplicand number (*d*), twice the multiplicand number (2*d*) and three times the multiplicand number (3*d*) and in which said multiple signal selection means is connected to be controlled by different pairs of consecutive digits of the multiplier number for selecting an appropriate one of said *d*, 2*d* or 3*d* signals or for preventing selection of any one of said signals in accordance with the value of each of said pairs of multiplier digits.

3. A multiplying arrangement for binary numbers according to claim 2 wherein said multiplicand number is represented in serial form as an electric pulse signal train and in which said multiple-signal providing means comprises a signal delay device supplied with said pulse signal train representing the multiplicand number (*d*), said signal delay device having a delay time equal to one digit period of said pulse train for providing a pulse signal train representing twice the multiplicand number (2*d*) and an adding circuit having two inputs supplied respectively with said pulse signal train representing the multiplicand number (*d*) and the output pulse signal train from said signal delay device representing twice said multiplicand number (2*d*) for providing a pulse signal train representing three times said multiplicand number (3*d*).

4. A multiplying arrangement according to claim 1 for operation with numbers represented in the binary scale in which said multiple-signal providing means includes means for providing electric signals representing respectively the multiplicand number (*d*), twice the multiplicand number (2*d*), three times the multiplicand number (3*d*), four times the multiplicand number (4*d*), five times the multiplicand number (5*d*), six times the multiplicand number (6*d*), and seven times the multiplicand number (7*d*) and in which said multiple-signal selection means is connected to be controlled by different groups of three consecutive digits of the multiplier number for selecting an appropriate one of said *d*, 2*d*, 3*d*, 4*d*, 5*d*, 6*d*, or 7*d* signals or for preventing selection of any one of said signals in accordance with the value of each of said groups of three multiplier digits.

5. A multiplying arrangement for binary numbers according to claim 1 wherein said multiplicand number and its multiples are each represented by a serial pulse signal train and in which said multiple-signal selection means includes a plurality of multiple input selection gate circuit devices, one for each of said different groups of *q* multiplier digits, said selection gate circuit devices being each supplied with each of said multiplicand multiple-representing signals and being controlled by different *q*-digit groups of said multiplier digits to allow transmission therethrough of one only of said multiple-representing signals, the outputs from such selection gate circuit devices being subsequently applied to said signal combining means.

6. A multiplying arrangement for binary numbers according to claim 5 wherein said signal combining means includes a plurality of signal delay means each operating to impose a delay measured in digit intervals of said pulse signal trains which is equal to the number of digits in said group of *q* controlling multiplier digits and a plurality of adding circuits each having two inputs and an output, the first of said signal delay means being connected to receive the output signals from the selection gate circuit device controlled by the most significant group of *q* multiplier digits and the first of said adding circuits having one of its inputs connected to receive the output signals from said first signal delay means and the other of its inputs connected to receive the output signals from the selection gate circuit device controlled by the group of *q* multiplier digits of next lower significance, the second of said signal delay means being connected to receive the output signals from said first adding circuit and the second of said adding circuits having one of its inputs connected to receive the output signals from said second signal delay means and having the other of its inputs connected to receive the output signals from the selection gate circuit device controlled by the group of *q* multiplier digits of next further lower significance, the remaining signal delay means and adding circuits being connected in similar manner with the final adding circuit having one of its inputs connected to receive the output signals of the final selection gate circuit device which is controlled by the group of *q* multiplier digits of lowest significance and having the other of its inputs supplied with the output signals from the final signal delay means, the output of such final adding circuit providing a product representing signal.

7. A multiplying arrangement for binary numbers according to claim 6 wherein each of said multiple input selection gate circuit devices is controlled by two multiplier digits and wherein such multiplier digits are each represented by sustained control potentials on individual control leads characterised in that said selection gate circuit devices each comprise a first gate circuit controlled by each of said multiplier diigt control potentials and providing an output to control a second gate circuit and a negator device, said second gate circuit having an input connected to the source of signals representing the multiplicand number multiplied by three, and third and fourth gate circuits each controlled by a different one of said multiplier digit control potentials and by an output from said negator device and having an input which is connected, in one instance to the source of multiplicand signals and in the other instance to source of signals representing the doubled multiplicand number, the outputs of said second, third and fourth gate circuits being subsequently combined in a single output lead.

8. A multiplying arrangement for binary numbers according to claim 6 wherein each of said multiple input selection gate circuit devices is controlled by two multiplier digits and wherein the value of each multiplier digit is represented by two alternative antiphase and sustained control potentials the first of which is at an active level only when the digit is of value '1' and the second of which is at active level only when the digit is of value '0' characterised in that said selection gate circuit devices each comprise a first gate circuit having its input supplied with the multiplicand representing signal and being controlled by the first control potential of the lower significance digit of the pair of controlling multiplier digits and by the second control potential of the higher significance multiplier digit, a second gate circuit having its input supplied with the signal representing the doubled value multiplicand number and being controlled by the second control potential of the lower significance multiplier digit and by the first control potential of the higher significance multiplier digit and a third gate circuit having its input supplied with the signal representing the trebled value multiplicand number and being controlled by the first control potentials of each of said multiplier digits, the outputs from said first, second and third gate circuits being combined in a single output lead.

9. A multiplying arrangement according to claim 8 wherein each of said gate circuits is of the type employing thermionic valves or diodes.

10. A multiplying arrangement according to claim 5 wherein said multiple input selection gate circuit devices comprise transistor devices.

11. A multiplying arrangement for an electronic digital computing machine operating in the binary notation with number signals each represented in serial form as an electric pulse signal train in which the sequential pulse positions represent successive binary digit values in ascending power order and which comprises input terminal means for receiving the multiplicand number-representing signal train, means connected to said input terminal for providing a plurality of separate electric pulse signal trains each on separate wires and representing respectively different multiples of said multiplicand number, a plurality of selection means each supplied with each of said different multiplicand multiple-representing signals from said separate wires, means for deriving static control potentials in accordance with each of the successive digit values of the multiplier signal, means for applying a first group of said control potentials to a first of said selection devices to control the appropriate selection of one of said different multiples of the multiplicand number in accordance with the value of a plurality of successive digits of the multiplier number comprising said first group, means for applying a second group of said control potentials to a second of said selection means to control the selection of the appropriate one of said multiplicand multiple signals in accordance with the value of a second group of successive multiplier digits comprised in said second group and similar means for applying subsequent groups of said multiplier digit control potentials to further ones of said selection means each to control selection of the appropriate one of said multiplicand multiple signals in accordance with the related value of the corresponding group of multiplier digits and means for combining the outputs of said selection means to provide a product-representing pulse signal train.

12. A multiplying arrangement for an electronic digital computing machine operating in the serial mode with numbers represented by electric pulse signal trains comprising input terminal means for the multiplicand-representing signal train, a first multiplicand signal busbar connected to said input terminal means, a second multiplicand signal busbar connected to said input terminal means through a first delay device imposing a delay equal to one digit interval time of said pulse trains, a third multiplicand signal busbar, a first adder circuit having one input connected to said input terminal means and a second input connected to said second multiplicand signal busbar and having its output connected to said third multiplicand signal busbar, staticisor means having separate sections, one for each of the different digits of the multiplier number, circuit means for applying the multiplier number signal train to said staticisor means, a first selection device having three alternative input terminals, an output terminal and two control terminals, said selection device having its three alternative inputs connected respectively to said first, second and third multiplicand signal busbars and its control terminals connected respectively to the outputs of said staticisor device dealing respectively with the most-significant and next-to-most-significant digit of said multiplier number, a second similar selection device having three alternative input terminals, an output terminal and two control input terminals, said second selection device having its three alternative inputs likewise connected respectively to said three multiplicand signal busbars and its control input terminals connected respectively to said staticisor to be controlled in accordance with the next two multiplier digits in descending power order, a plurality of further selection devices each having similar three alternative input terminals, an output terminal and two control terminals, said further selection devices being likewise connected to said first, second and third multiplicand signal busbars and having their control inputs connected to the appropriate pair of outputs of said staticisor device dealing with pairs of multiplier digits in descending power order, a second adder circuit, a second delay device imposing a time delay of two digit interval times of said pulse signal trains, said second adder circuit having its first input connected to the output of said first selection device through said second delay device and its second input terminal connected directly to the output of said second selection means, a third adder circuit, a third delay device similar to said second delay device, said third adder circuit having its first input terminal connected through said third delay device to the output of said second adder circuit and having its second input terminal connected directly to the output of the first of said further selection devices, a plurality of further adder circuits, a plurality of further delay devices similar to said second and third delay devices, said adder circuits being similarly connected to said further delay devices and to said further selection devices, the last of said adder circuits having its first input terminal connected through the last of said delay means to the output of the next-to-last adding device and having its second input terminal connected directly to the output of the last of said selection means, the output terminal of said last adder circuit serving to provide directly a product-representing pulse signal train.

13. A multiplying arrangement for an electronic digital computing machine comprising input terminal means for receiving signals representative of the multiplicand number D, a plurality of multiple-representing signal supply means, said multiple-representing signal supply means being connected to said input terminal means to provide respectively multiple-signals representative of different multiples of the multiplicand number D within the range D, 2D . . . $p$D where p is the total number of integral factors capable of being defined by a single group of a predetermined number $q$ of digits of the multiplier number R, a plurality of multiple-signal selection means equal to the number of $q$-digit groups in the multiplier number R, means for deriving a plurality of separate control potentials dependent respectively upon the values of the different digits of said multiplier R, circuit means for connecting each of said multiple-signal supply means to each of said selection means, means for applying said control potentials to said selection means whereby the control potentials determined by a first group of $q$ digits of said multiplier number R control a first of said selection means, the control potentials determined by a second group of $q$ digits of said multiplier number R control a second of said selection means and so on and means for combining the selected multiplicand-multiple signal outputs from said selection means to represent the required product number.

References Cited in the file of this patent

UNITED STATES PATENTS

| | | |
|---|---|---|
| 2,304,495 | Cunningham | Dec. 8, 1942 |
| 2,332,304 | Davies | Oct. 19, 1943 |
| 2,344,885 | Kozma | Mar. 21, 1944 |
| 2,604,262 | Phelps | July 22, 1952 |